(12) United States Patent
Gibb et al.

(10) Patent No.: US 10,962,152 B2
(45) Date of Patent: Mar. 30, 2021

(54) METHOD OF PREPARING A PRE-ASSEMBLED PIPE COUPLING

(71) Applicant: Victaulic Company, Easton, PA (US)

(72) Inventors: John Gibb, Alliston (CA); Douglas R. Dole, Whitehouse Station, NJ (US); Michael V. Porter, Easton, PA (US)

(73) Assignee: Victaulic Company, Easton, PA (US)

( * ) Notice: Subject to any disclaimer, the term of this patent is extended or adjusted under 35 U.S.C. 154(b) by 209 days.

(21) Appl. No.: 15/662,376

(22) Filed: Jul. 28, 2017

(65) Prior Publication Data
US 2017/0321828 A1 Nov. 9, 2017

Related U.S. Application Data

(63) Continuation of application No. 14/277,271, filed on May 14, 2014, now Pat. No. 9,726,310, which is a
(Continued)

(51) Int. Cl.
*F16L 21/06* (2006.01)
*F16L 21/02* (2006.01)
(Continued)

(52) U.S. Cl.
CPC ............... *F16L 21/02* (2013.01); *F16L 17/04* (2013.01); *F16L 21/005* (2013.01);
(Continued)

(58) Field of Classification Search
CPC ......... F16L 17/04; F16L 17/03; F16L 17/035; F16L 17/06; F16L 23/04; F16L 23/08; F16L 23/10
(Continued)

(56) References Cited

U.S. PATENT DOCUMENTS

| 29,731 A | 8/1860 | Truss |
|---|---|---|
| 1,093,868 A | 4/1914 | Leighty |

(Continued)

FOREIGN PATENT DOCUMENTS

| DE | 10006029 A1 | 10/2000 |
|---|---|---|
| EP | 0306946 A2 | 8/1988 |

(Continued)

OTHER PUBLICATIONS

Kerins, John C.; Song, Daniel S.; and Martin, Brett C.; USPTO Decision on Appeal re: Reexamination Application No. 95/001,878; Jul. 13, 2016.

(Continued)

*Primary Examiner* — Aaron M Dunwoody
(74) *Attorney, Agent, or Firm* — Ballard Spahr LLP (57) ABSTRACT

A method for preparing a factory assembled pipe coupling includes positioning a flexible, resilient ring within a first channel in the first segment of the coupling, the ring having a ring outer surface engaging the first segment, and engaging a second channel in a second segment of the coupling with the ring outer surface so as to align each connection member on the first segment with a connection member on the second segment. Further steps include attaching the first end of the first segment to the first end of the second segment, and attaching the second end of the first segment to the second end of the second segment and supporting the first and second segments in spaced apart relation from one another on the ring at a distance at least sufficient to permit insertion of the pipe elements into the central space without disassembling the segments.

14 Claims, 8 Drawing Sheets

Related U.S. Application Data continuation of application No. 11/867,146, filed on Oct. 4, 2007, now Pat. No. 8,733,799, which is a continuation of application No. 11/128,728, filed on May 13, 2005, now abandoned.

(60) Provisional application No. 60/571,596, filed on May 14, 2004.

(51) Int. Cl.
*F16L 21/00* (2006.01)
*F16L 17/04* (2006.01)
*F16L 23/08* (2006.01)
*F16L 23/18* (2006.01)
*F16L 25/14* (2006.01)

(52) U.S. Cl.
CPC ............ *F16L 21/065* (2013.01); *F16L 23/08* (2013.01); *F16L 23/18* (2013.01); *F16L 25/14* (2013.01); *Y10T 29/53987* (2015.01)

(58) Field of Classification Search
USPC ................. 285/337, 365, 367, 373, 111, 112
See application file for complete search history.

(56) References Cited

U.S. PATENT DOCUMENTS

| | | |
|---|---|---|
| 1,541,601 A | 6/1925 | Tribe |
| 1,851,574 A | 3/1932 | Fiederlein |
| 1,867,891 A | 7/1932 | Reynolds |
| 2,020,156 A | 11/1935 | Muchnic |
| 2,041,132 A | 5/1936 | Johnson |
| 2,449,795 A | 9/1948 | Stillwagon |
| 2,688,500 A | 9/1954 | Scott |
| 2,709,094 A | 5/1955 | Planski |
| 2,752,173 A | 6/1956 | Krooss |
| 3,176,723 A | 4/1965 | Hodgeman et al. |
| 3,213,187 A | 10/1965 | Kish |
| 3,291,506 A | 12/1966 | Blakeley |
| 3,351,352 A | 11/1967 | Blakeley et al. |
| 3,464,722 A | 9/1969 | Larkin |
| 3,550,638 A | 12/1970 | Smith |
| 3,794,361 A | 2/1974 | Westberg |
| 3,966,237 A | 6/1976 | Thiessen |
| 3,977,705 A | 8/1976 | Theissen et al. |
| 4,258,941 A | 3/1981 | Sands |
| 4,311,248 A | 1/1982 | Westerlund et al. |
| 4,326,737 A | 4/1982 | Lehmann |
| 4,403,378 A | 9/1983 | Engman |
| 4,471,979 A | 9/1984 | Gibb et al. |
| 4,506,418 A | 3/1985 | Viola et al. |
| 4,522,434 A | 6/1985 | Webb |
| 4,601,495 A | 7/1986 | Webb |
| 4,611,839 A | 9/1986 | Rung et al. |
| 4,640,530 A | 2/1987 | Abbes et al. |
| 4,643,461 A | 2/1987 | Thau, Jr. et al. |
| 4,702,500 A | 10/1987 | Thau, Jr. et al. |
| 4,722,561 A | 2/1988 | Heckethorn et al. |
| 4,726,611 A | 2/1988 | Sauer |
| 4,861,075 A | 8/1989 | Pepi et al. |
| 4,893,843 A | 1/1990 | DeRaymond |
| 4,896,902 A | 1/1990 | Weston |
| 5,018,548 A | 5/1991 | McLennan |
| 5,058,931 A | 10/1991 | Bowsher |
| 5,094,492 A | 3/1992 | Levivier |
| 5,142,536 A | 8/1992 | Akao et al. |
| 5,203,594 A | 4/1993 | Straub |
| 5,230,537 A | 7/1993 | Newman |
| 5,248,169 A | 9/1993 | Barbe et al. |
| 5,249,829 A | 10/1993 | Hendrickson |
| 5,280,970 A | 1/1994 | Straub |
| 5,498,042 A | 3/1996 | Dole |
| 5,647,613 A | 7/1997 | Marik et al. |
| 5,758,906 A | 6/1998 | Carlstrom et al. |
| 5,911,446 A | 6/1999 | McLennan et al. |
| 6,070,911 A | 6/2000 | Namikawa et al. |
| 6,170,884 B1 | 1/2001 | McLennan et al. |
| 6,302,450 B1 | 10/2001 | Dole et al. |
| 6,312,025 B1 | 11/2001 | Wolfsdorf |
| 6,367,843 B1 | 4/2002 | Fetzer |
| 6,367,849 B1 | 4/2002 | Tatsuta et al. |
| 6,581,977 B1 | 6/2003 | Dole et al. |
| 8,282,136 B2* | 10/2012 | Vandal .................... F16L 17/04 285/112 |
| 2005/0253029 A1* | 11/2005 | Gibb ...................... F16L 17/04 248/158 |
| 2008/0007061 A1* | 1/2008 | Gibb ...................... F16L 17/04 285/364 |
| 2008/0129048 A1* | 6/2008 | Nagle ..................... F16L 17/04 285/412 |
| 2010/0148493 A1* | 6/2010 | Madara ................ F16L 17/025 285/24 |
| 2011/0037250 A1* | 2/2011 | Bowman ................. F16L 17/04 285/110 |
| 2011/0062706 A1* | 3/2011 | Henry .................. F16L 17/032 285/356 |
| 2011/0154646 A1* | 6/2011 | Hagiya .................. F16L 23/08 29/505 |
| 2012/0139236 A1* | 6/2012 | Novitsky ............... B21D 41/00 285/399 |
| 2013/0125373 A1* | 5/2013 | Bancroft ................. F16L 17/04 29/525.01 |
| 2013/0185919 A1* | 7/2013 | Beagen, Jr. .......... F16L 17/025 29/525.02 |
| 2013/0187346 A1* | 7/2013 | Beagen, Jr. .......... F16L 21/065 277/626 |
| 2013/0187379 A1* | 7/2013 | Beagen, Jr. .......... F16L 21/065 285/337 |
| 2013/0257045 A1* | 10/2013 | Mikami .................. F16L 17/04 285/364 |
| 2015/0176728 A1* | 6/2015 | Bowman ................ F16L 21/065 285/309 |
| 2017/0167645 A1* | 6/2017 | Bancroft ................ F16J 15/022 |
| 2018/0163905 A1 | 6/2018 | Ohnemus et al. |
| 2018/0163906 A1 | 6/2018 | Ohnemus et al. |

FOREIGN PATENT DOCUMENTS

| | | |
|---|---|---|
| GB | 2211255 | 6/1989 |
| GB | 2218768 A | 11/1989 |
| JP | 2753463 B2 | 5/1998 |
| JP | 2000146047 A | 5/2000 |
| KR | 200243117 | 8/2001 |
| KR | 300341804 | 12/2003 |
| WO | 0057093 | 9/2000 |
| WO | 0159350 A1 | 8/2001 |

OTHER PUBLICATIONS

Song, Daniel S.; Guest, Rae Lynn P.; and Martin, Brett C.; USPTO Decision on Appeal re: Reexamination Application No. 95/001,880; Feb. 22, 2017.
Author Unknown; Asia Joint Catalog; 23 pages; Jul. 17, 2019.
Intellectual Property Trial and Appeal Board—Trial Ruling; *ADS Co., Ltd.* v. *Victaulic Company*; Trial Ruling Apr. 29, 2019.
Patent Court 4th Division Decision; *AJS Co., Ltd.* v. *Victaulic Company*; Decision rendered on May 22, 2020.
Supreme Court 3rd Division Judgment; *AJS Co., Ltd.* v. *Victaulic Company*; Sep. 24, 2020.

* cited by examiner

METHOD OF PREPARING A PRE-ASSEMBLED PIPE COUPLING

CROSS-REFERENCE TO RELATED APPLICATIONS

This application is a continuation of U.S. application Ser. No. 14/277,271, filed May 14, 2014, now U.S. Pat. No. 9,726,310, issued Aug. 8, 2017, which is a continuation of U.S. application Ser. No. 11/867,146, filed Oct. 4, 2007, now U.S. Pat. No. 8,733,799, issued May 27, 2014, which is a continuation of U.S. application Ser. No. 11/128,728, filed May 13, 2005, now abandoned, which claims priority to U.S. Provisional Application No. 60/571,596, filed May 14, 2004, all aforementioned applications being hereby incorporated by reference herein.

FIELD OF THE INVENTION

This invention relates to factory assembled mechanical pipe couplings for joining pipe elements.

BACKGROUND OF THE INVENTION

Mechanical couplings for joining pipe elements together end-to-end comprise interconnectable segments that are positionable circumferentially surrounding the end portions of co-axially aligned pipe elements. The term "pipe element" is used herein to describe any pipe-like item or component having a pipe like form. Pipe elements include pipe stock, pipe fittings such as elbows, caps and tees as well as fluid control components such as valves, reducers, strainers, restrictors, pressure regulators and the like.

Each mechanical coupling segment comprises a housing having arcuate surfaces which project radially inwardly from the housing and engage plain end pipe elements or circumferential grooves that extend around each of the pipe elements to be joined. Engagement between the arcuate surfaces and the pipe elements provides mechanical restraint to the joint and ensures that the pipe elements remain coupled even under high internal pressure and/or external forces. The housings define an annular channel that receives a sealing member, typically an elastomeric ring which engages the ends of each pipe element and cooperates with the segments to provide a fluid tight seal. The segments have connection members, typically in the form of lugs which project outwardly from the housings. The lugs are adapted to receive fasteners, such as nuts and bolts, which are adjustably tightenable to draw the segments toward one another.

To ensure a good fit between the couplings and the pipe elements, the arcuate surfaces on prior art couplings have a radius of curvature that is substantially matched to the radius of curvature of the outer surface of the pipe element that it is intended to engage. For couplings used with grooved pipe elements, the radii of curvature of the arcuate surfaces are smaller than the radii of curvature of the outer surfaces of the pipe elements outside of the grooves so that the arcuate surfaces fit within and engage the grooves properly.

This geometrical relation between the arcuate surfaces of the couplings and the outer surfaces of the pipe elements in prior art couplings results in a tedious and time consuming installation process when mechanical couplings are used. Typically, the coupling is received by the technician with the segments bolted together and the ring seal captured within the segments' channels. The technician first disassembles the coupling by unbolting it, removes the ring seal, lubricates it (if not pre-lubricated) and places it around the ends of the pipe elements to be joined. Installation of the ring seal requires that it be lubricated and stretched to accommodate the pipe elements, an often difficult and messy task, as the ring seal is usually stiff and the lubrication makes manual manipulation of the seal difficult. With the ring seal in place on both pipe elements, the segments are then placed one at a time straddling the ends of the pipe elements and capturing the ring seal against them. During placement, the segments engage the seal, the arcuate surfaces are aligned with the grooves, the bolts are inserted through the lugs, the nuts are threaded onto the bolts and tightened, drawing the coupling segments toward one another, compressing the seal and engaging the arcuate surface within the grooves.

As evident from the previous description, installation of mechanical pipe couplings according to the prior art requires that the technician typically handle at least seven individual piece parts (and more when the coupling has more than two segments), and must totally disassemble and reassemble the coupling. Significant time, effort and expense would be saved if the technician could install a mechanical pipe coupling without first totally disassembling it and then reassembling it, piece by piece.

SUMMARY OF THE INVENTION

The invention concerns a method of preparing a factory assembled coupling for receiving pipe elements to be joined end to end. In an example embodiment, the coupling comprises first and second segments. Each segment has first and second ends oppositely disposed. A respective connection member is positioned at each end. In one example embodiment the method comprises:

positioning a flexible, resilient ring within a first channel in the first segment, the ring having a ring outer surface engaging the first segment;

engaging a second channel in the second segment with the ring outer surface so as to align each connection member on the first segment with a respective one of the connection members on the second segment;

attaching the first end of the first segment to the first end of the second segment, and attaching the second end of the first segment to the second end of the second segment such that the segments surround the ring and define a central space for receiving the pipe elements; and supporting the first and second segments in spaced apart relation from one another on the ring at a distance at least sufficient to permit insertion of the pipe elements into the central space without disassembling the segments from one another.

An example method may further comprise positioning the ring between a first pair of arcuate projections positioned on opposite sides of the first segment.

Another example embodiment comprises engaging the second segment with the ring between a second pair of arcuate projections on opposite sides of the second segment.

An example method may further comprise adjustably tightening at least two of the connection members to a predetermined position with respect to one another.

Further by way of example, the method may comprise measuring the predetermined position at the ends of the segments.

An example embodiment may also comprise adjustably tightening the connection members so as to deform the ring.

Another example embodiment comprises adjustably tightening the connection members and thereby drawing each segment into engagement with the outer surface of the ring.

An example embodiment may further comprise maintaining the segments in the spaced apart relation during shipping and through handling of the coupling during insertion of the pipe elements into the central space.

The invention also encompasses a method of preparing a factory assembled coupling for receiving pipe elements to be joined end to end wherein the coupling comprises a plurality of segments. Each segment has first and second ends oppositely disposed and a respective connection member positioned at each end. In an example embodiment the method comprises:

attaching the plurality of segments to one another end to end such that the segments surround and define a central space for receiving the pipe elements, a respective channel being positioned within each segment, the channels facing the central space;

positioning a flexible, resilient ring within the channel in each segment, the ring having a ring outer surface engaging the plurality of segments; and supporting the segments in spaced apart relation from one another on the ring at a distance at least sufficient to permit insertion of the pipe elements into the central space without disassembling the segments from one another.

By way of example, the method may further comprise positioning the ring between pairs of arcuate projections respectively positioned on opposite sides of each segment.

Also by way of example, the method may further comprise adjustably tightening at least two of the connection members to a predetermined position with respect to one another.

An example further comprises measuring the predetermined position at the ends of the segments.

An example method may further comprise adjustably tightening the connection members so as to deform the ring.

Further by way of example, the method may comprise adjustably tightening the connection members and thereby drawing each segment into engagement with the outer surface of the ring.

Additionally by way of example, the method may further comprise maintaining the segments in the spaced apart relation during shipping and through handling of the coupling during insertion of the pipe elements into the central space.

DETAILED DESCRIPTION

Figure 1:
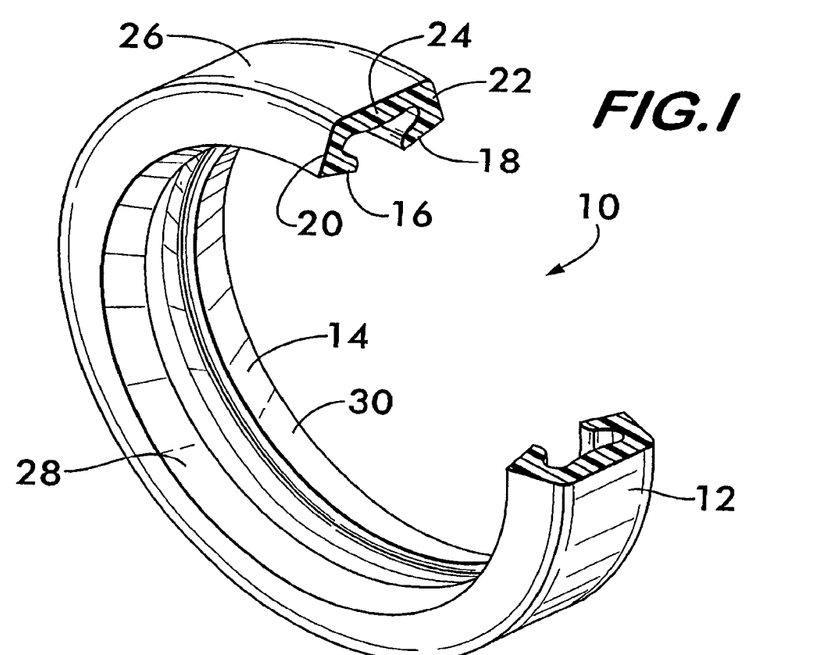
FIG. 1 is an isometric view, partially cut away, of an embodiment of a sealing member used in the method according to the invention.

FIG. 1 shows a perspective view of a sealing member 10 according to the invention. Sealing member 10 comprises a flexible, resilient ring 12 having a ring inner surface 14. Preferably, ring inner surface 14 is formed of a pair of lips 16 and 18 that are attached to respective sidewalls 20 and 22 that extend from a backwall 24. Backwall 24 provides a ring outer surface 26 that extends circumferentially around the ring. The sidewalls and the lips are positioned in spaced apart relation on opposite sides of the ring 12. Lips 16 and 18 project substantially inwardly toward one another and have respective conical surfaces 28 and 30 that slope inwardly toward the center of ring 12 to act as a lead-in to guide pipe elements into engagement with the sealing member as described below.

Figure 2:
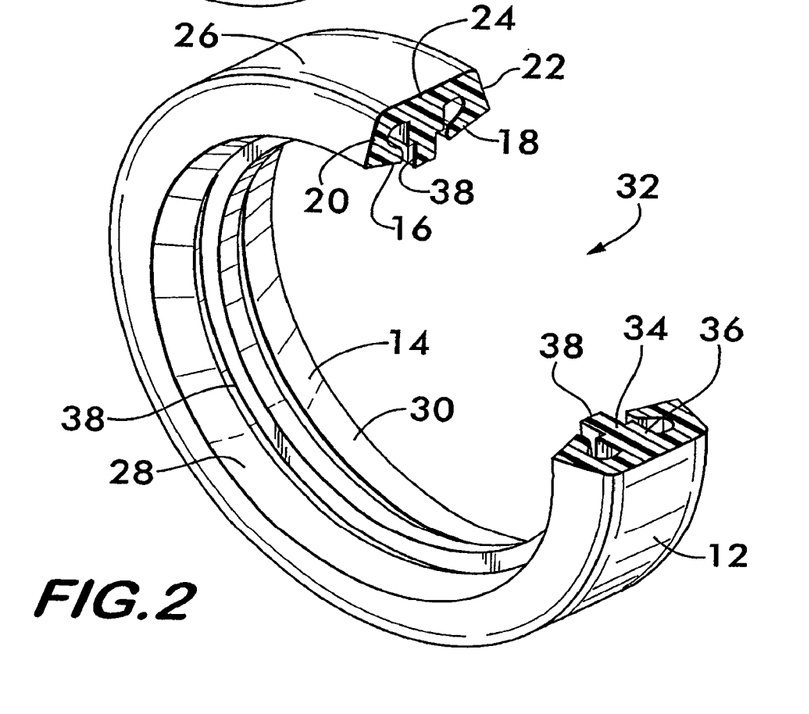
FIG. 2 is an isometric view, partially cut away, of another embodiment of a sealing member used in the method according to the invention.
Figure 2A:
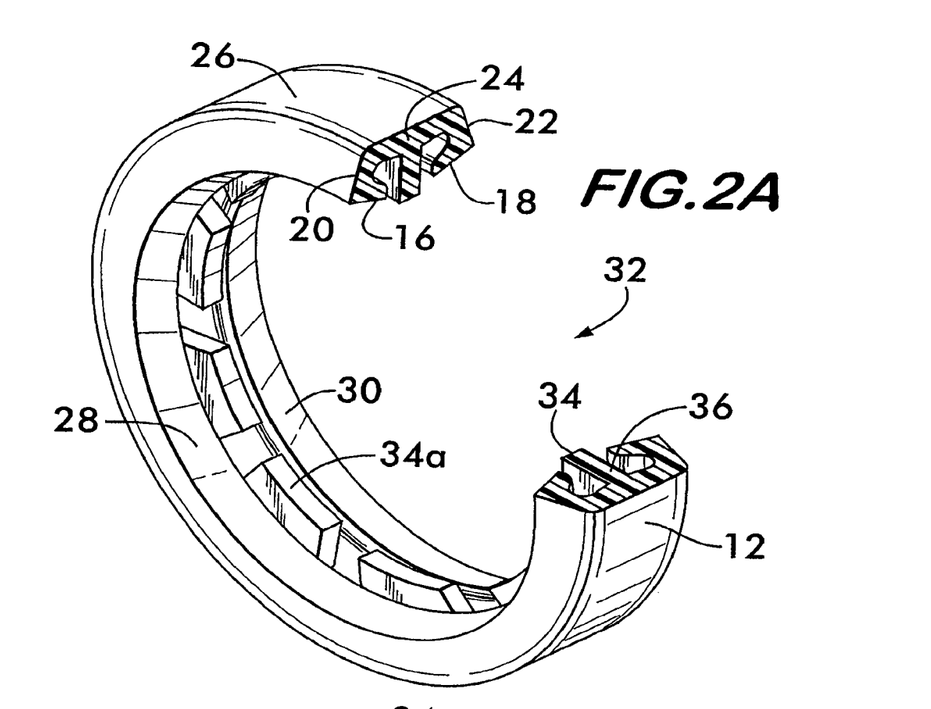
FIG. 2A is an isometric view, partially cut away, of another embodiment of a sealing member used in the method according to the invention.
Figure 2B:
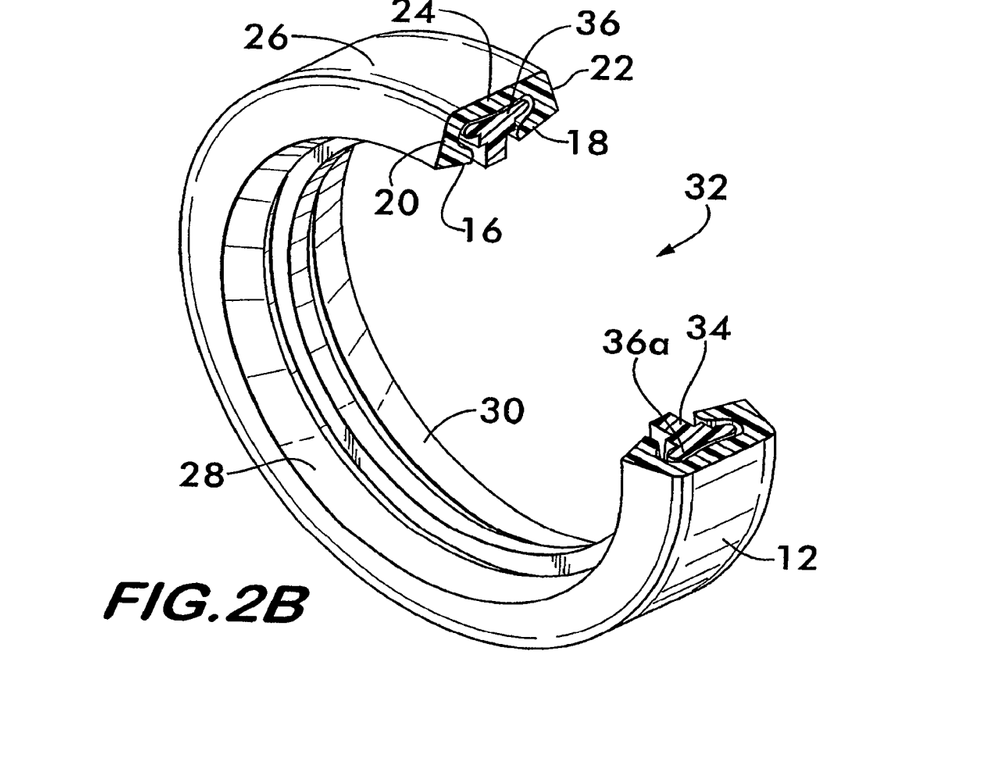
FIG. 2B is an isometric view, partially cut away, of yet another embodiment of a sealing member used in the method according to the invention.

In a preferred embodiment 32 of the sealing member, shown in FIG. 2, ring 12 further includes a tongue 34. Tongue 34 is positioned between lips 16 and 18 and has a root portion 36 that is attached to the backwall 24 opposite to the ring outer surface 26. Tongue 34 projects substantially radially inwardly from the backwall 24 and extends circumferentially around ring 12. The tongue may be substantially continuous, as shown in FIG. 2, or may comprise a plurality of sections 34a in spaced apart relation to one another around the ring as shown in FIG. 2A. In another embodiment, shown in FIG. 2B, the root portion 36 of tongue 34 is not attached to the backwall 24, but has a flared base 36a that engages the backwall and side walls 20 and 22 to maintain the tongue in position between lips 16 and 18.

Figure 3:
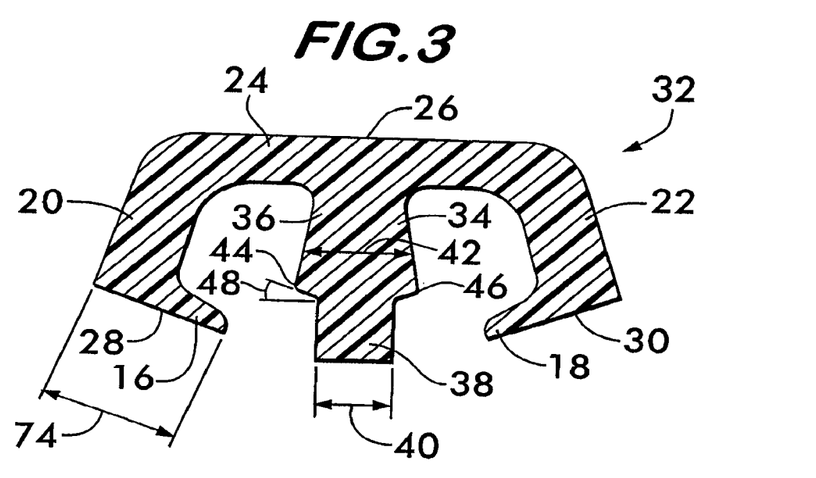
FIG. 3 is a cross sectional view of a sealing member embodiment used in the method according to the invention.

In a preferred embodiment 32, best shown in FIG. 3, tongue 34 has a tip portion 38 extending from the root portion 36. The thickness 40 of tip portion 38 is smaller than the thickness 42 of the root portion 36. This dimensional relation results in a pair of shoulders 44 and 46 being formed between the root and tip portions. Preferably, the shoulders 44 and 46 have conical profile shapes for engaging and guiding pipe elements as described below. Cone angles 48 up to about 30° are advantageous for the functioning of the tongue 34.

Figure 4:
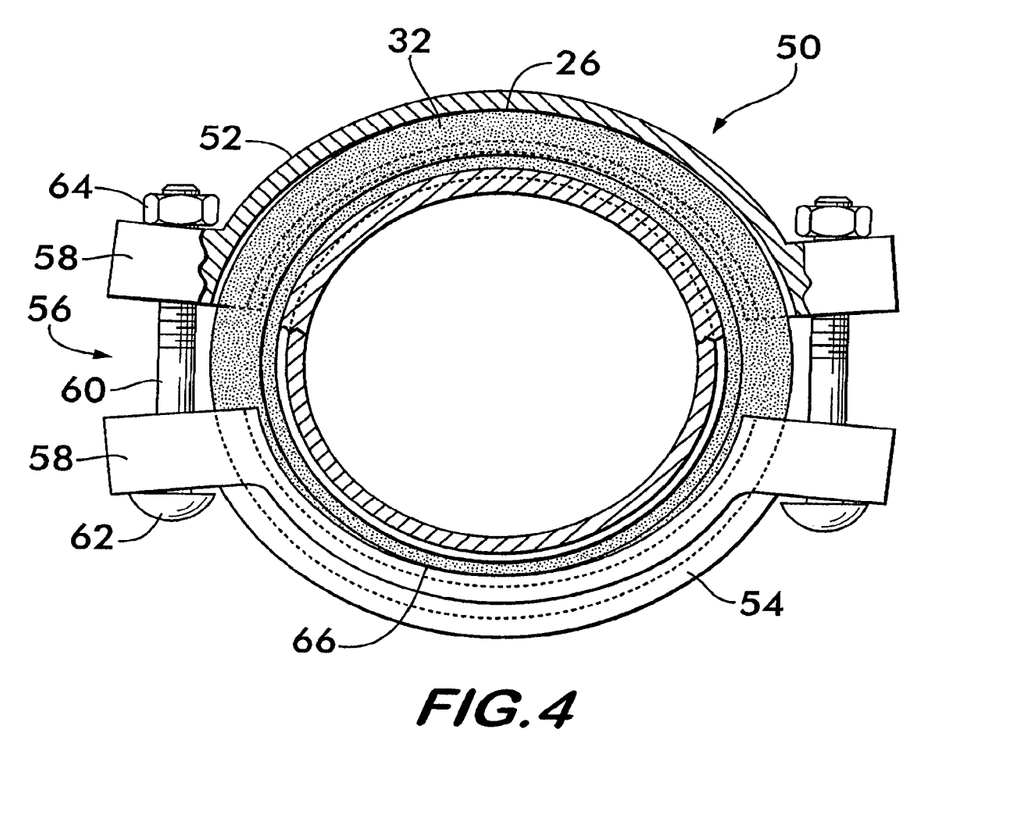
FIG. 4 is an axial cross sectional view of a factory assembled coupling prepared according to the method of the invention.

As shown in FIG. 4, sealing members such as 10 and 32 are used with factory assembled mechanical couplings 50 for securing pipe elements together in end to end relation, the sealing members ensuring a fluid tight joint. (Hereinafter, sealing member embodiment 32 is described, it being understood that the description applies to all sealing member embodiments according to the invention.)

Coupling 50 comprises a plurality of coupling segments, in this example, two segments 52 and 54. The coupling segments are connected to one another by adjustably tightenable connection members 56, which preferably comprise lugs 58 that extend outwardly from the ends of each segment and are positioned in facing relation to one another to receive fasteners 60, such as bolts 62 and nuts 64. Each segment also has a pair of arcuate surfaces 66 that are positioned in spaced relation to one another and face inwardly for engagement with the outer surfaces of respective pipe elements as described below.

Figure 5:
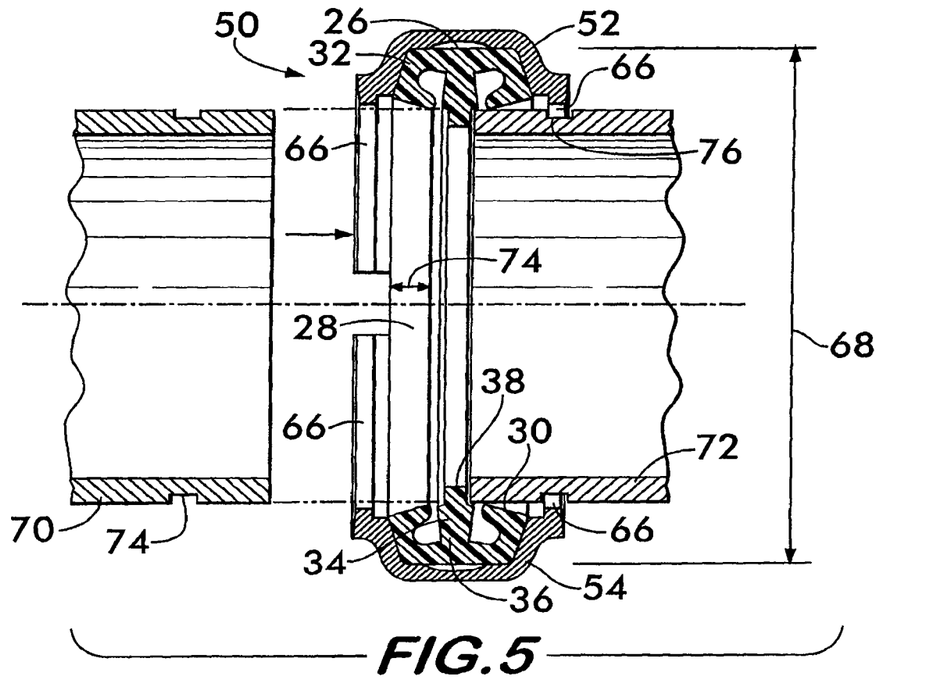
FIGS. 5 and 6 are longitudinal sectional views of the factory assembled coupling shown in FIG. 4.
Figure 6:
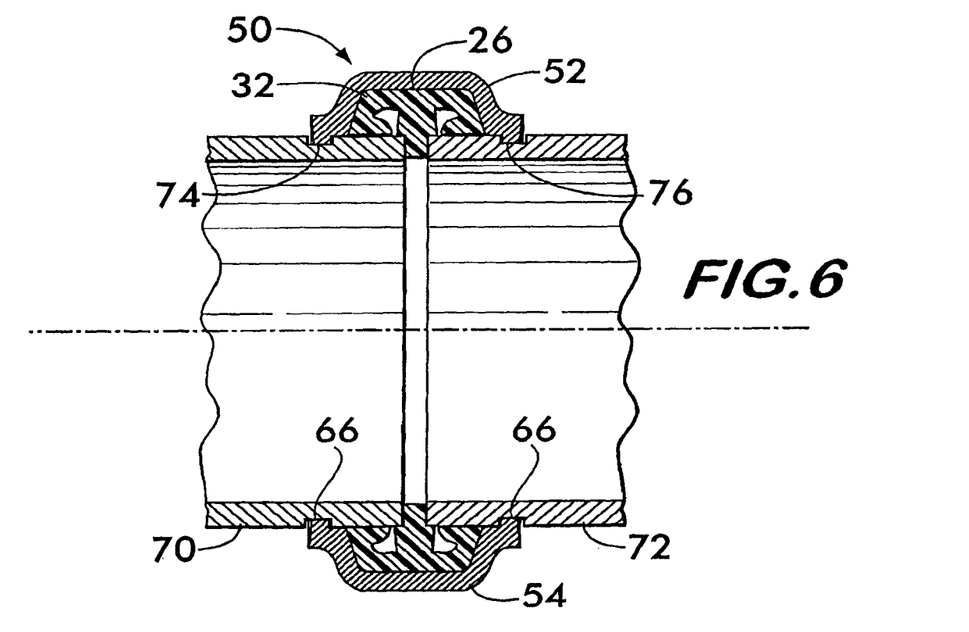
Figure 7:
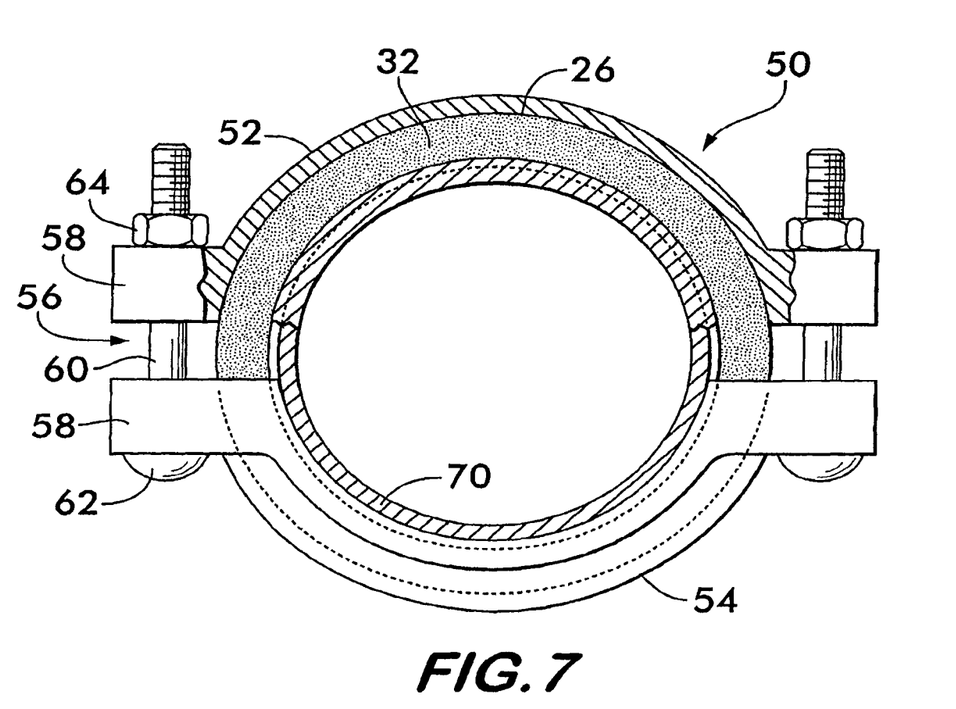
FIG. 7 is an axial cross sectional view of the factory assembled coupling shown in FIG. 4.

FIG. 4 further shows the coupling 50 in a factory assembled state, with segments 52 and 54 supported on the ring outer surface 26, the segments being held together in the factory assembled state by the fasteners 60. The coupling 50 is factory assembled under controlled conditions at the manufacturing facility and arrives on site in the factory assembled state, ready for immediate use. As shown in FIG. 5, sealing member 32 is designed so that the ring outer surface 26 has a diameter 68 sized to maintain the segments 52 and 54 in spaced relation with sufficient clearance to allow pipe elements 70 and 72 to be inserted between the segments 52 and 54 without disassembling the coupling. Use of seals according to the invention thus provides significant advantage in reducing the labor required for assembly of the pipe joint as the coupling does not require total or even partial disassembly prior to the installation. Sealing member 32 also has sufficient stiffness to maintain the coupling segments in spaced apart relation through shipping and handling during installation, but is resilient and flexible, allowing it to deform as required when the fasteners 60 are tightened to draw the coupling segments 52 and 54 toward one another and engage the coupling arcuate surfaces 66 with the pipe elements as shown in FIGS. 6 and 7 to secure the pipe elements 70 and 72 in end to end relation and provide a fluid tight joint.

Note that the conical surfaces 28 and 30 of lips 16 and 18 each have a width 74 (see FIG. 3) that is sized so that the pipe elements engage the lips on the conical surfaces as they are inserted into coupling 50 (see FIG. 5). This conical lip geometry facilitates assembly of the pipe joint with the factory assembled coupling. The lips serve as a lead in to guide the pipe elements into proper engagement with the seal, and also eliminate the need to remove the seal from the coupling and manually stretch and deform it to enable it to receive the pipe elements, as must be done for prior art seals.

Tongue 34 also enhances the ability to quickly and conveniently install pipe elements into the factory assembled coupling 50. The conical profile of shoulders 44 and 46 further serves as a lead-in to guide the pipe elements into proper engagement with the sealing member 32. The shoulders 44 and 46 engage the ends of the pipe elements and limit the tongue's extension into the bore of the pipe elements where it might impede fluid flow and increase the head loss. Head loss due to resistance in joints becomes significant for long pipe runs having many joints, and is to be avoided. The tongue itself further serves as a stop to align the arcuate surfaces 66 of segments 52 and 54 with a desired target on the outer surface of the pipe elements, in the example shown in FIGS. 5 and 6, circumferential grooves 74 and 76. Engagement between the grooves and the arcuate surfaces provide mechanical restraint to secure the pipe elements to the coupling.

Figure 8:
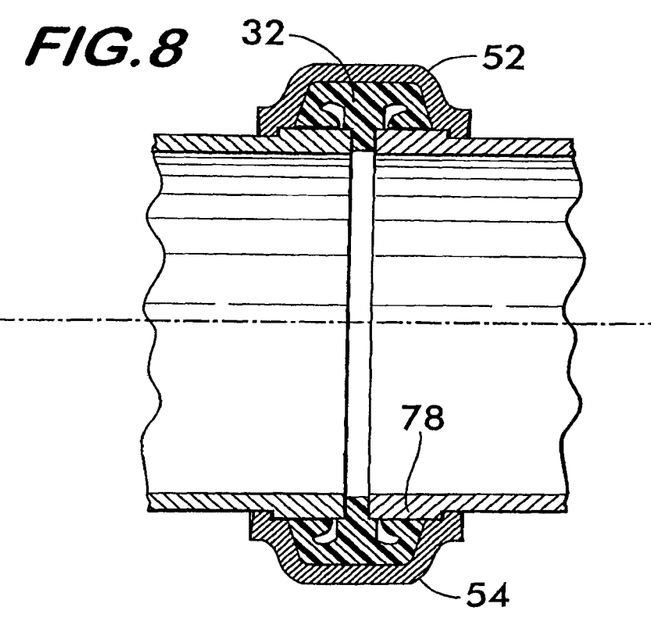
FIGS. 8 and 9 are longitudinal sectional views of pipe joints using sealing members according to the invention.
Figure 9:
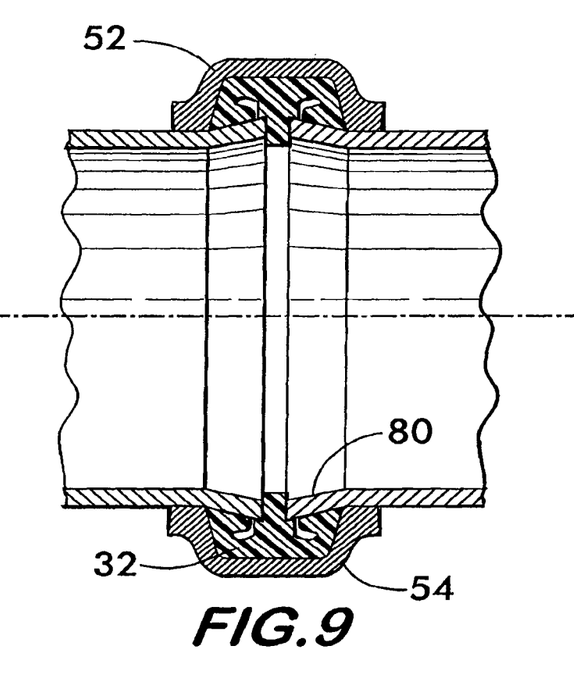

Virtually any type of pipe element will benefit from the use of seals according to the invention. If plain end pipe elements are used (not shown), the target may be witness marks formed on the outer surface to indicate proper engagement depth between pipe element and coupling. As shown in FIGS. 8 and 9, pipe elements having shoulders 78 (FIG. 8) or pipe elements having flared ends 80 (FIG. 9) may be used with the sealing member according to the invention, the sealing member being readily geometrically adaptable to receive the various types of pipe elements.

Sealing members according to the invention may also be used with any type of multi-segment factory assembled coupling where a seal is used to maintain separation between the segments in a factory assembled state. The couplings themselves may have enhancements that provide additional clearance for insertion of the pipe elements, allowing the segments to be closer to one another in the factory assembled state and still permit direct insertion of the pipe elements without any disassembly. To this end, the factory assembled coupling shown in FIG. 4 is deformable as shown by a comparison of FIGS. 4 and 7. In the undeformed state, the arcuate surfaces 66 have a greater radius of curvature than the pipe elements that they are joining, and the surfaces 66 also subtend an arc of less than 180°. This geometry provides clearance at the 3 o'clock and 9 o'clock positions on the coupling (for a two segment coupling) allowing pipe element insertion. The coupling segments are deformed by tightening fasteners 60, which draw the segments 52 and 54 toward each other and force the arcuate surfaces 66 to engage the pipe elements and conform to its radius of curvature.

Figure 10:
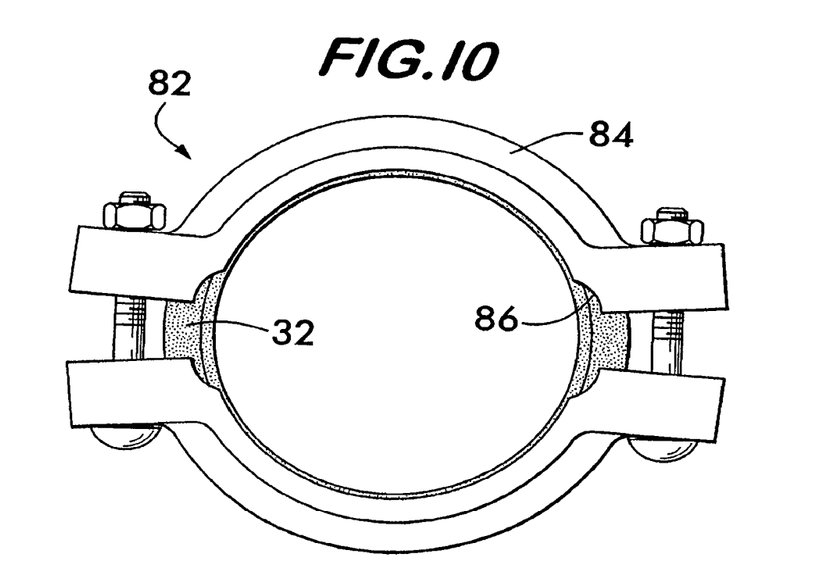
FIGS. 10 and 11 are axial cross sectional views of factory assembled couplings prepared according to the method of the invention.
Figure 11:
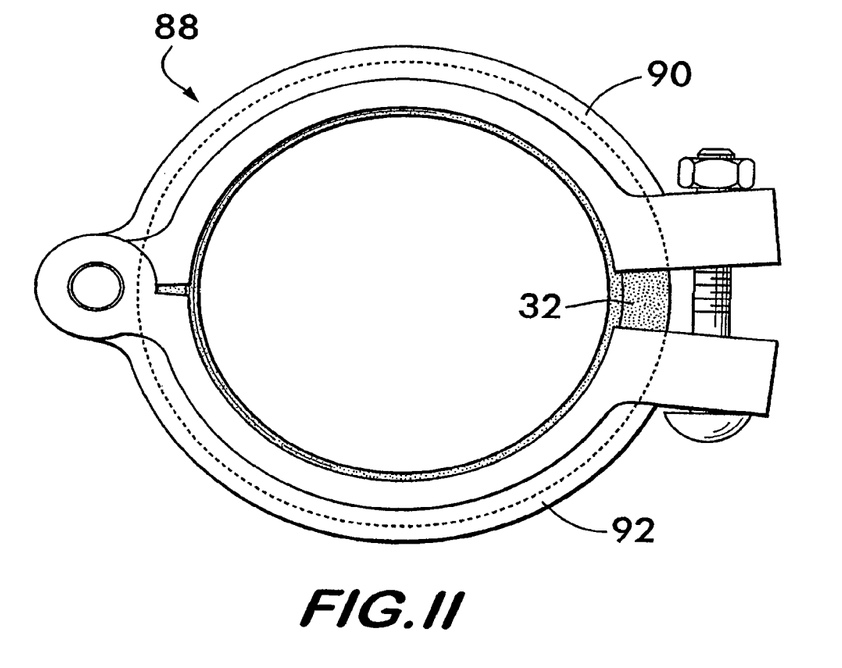
Figure 12:
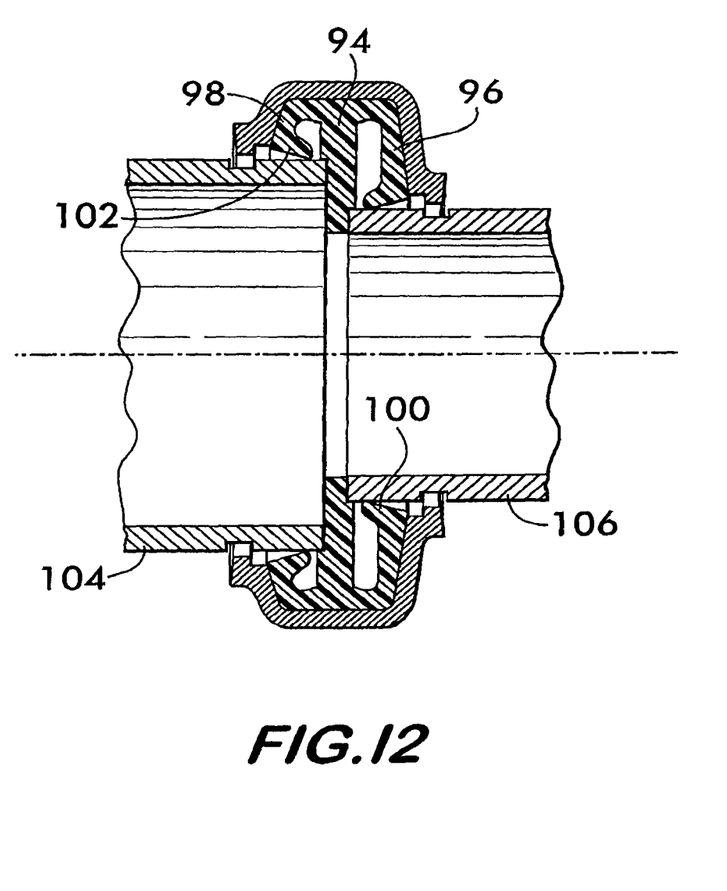
FIG. 12 is a longitudinal sectional view of an embodiment of a sealing member used in the method according to the invention.

FIG. 10 illustrates a factory assembled pipe coupling 82 having segments 84 with cut-outs 86 at opposite ends of the arcuate surfaces 66. The cut-outs provide the desired clearance enhancement for the coupling. FIG. 11 shows a factory assembled hinged coupling 88 wherein a sealing member 32 is used to maintain the segments 90 and 92 open to permit pipe element insertion. In FIG. 12 the sealing member 94 has one sidewall 96 that is wider than its other sidewall 98. This geometry positions the lip 100 attached to sidewall 96 at a smaller diameter than lip 102 attached to sidewall 98. The different diameter lips allow the seal to be used to couple pipe elements 104 and 106 having different diameters.

Sealing members according to the invention used with multi-segment factory assembled couplings provide a significant advantage in assembly of pipe joints because they permit the couplings to be maintained in spaced relation in a factory assembled state that facilitates assembly of the joint without the need to first disassemble the couplings.

What is claimed is:

1. A method of preparing a factory assembled coupling for receiving pipe elements to be joined end to end, said coupling comprising first and second segments, each having first and second ends oppositely disposed and a respective connection member positioned at each said end, said method comprising:

positioning a flexible, resilient ring within a first channel in said first segment, said ring having a ring outer surface engaging said first segment;

engaging a second channel in said second segment with said ring outer surface so as to align each said connection member on said first segment with a respective one of said connection members on said second segment;

attaching said first end of said first segment to said first end of said second segment, and attaching said second end of said first segment to said second end of said second segment such that said segments surround said ring and define a central space for receiving said pipe elements;

adjustably tightening said connection members and thereby drawing each said segment into engagement with said outer surface of said ring and thereby supporting said first and second segments in spaced apart relation from one another on said ring at a distance at least sufficient to permit insertion of said pipe elements into said central space without disassembling said segments from one another.

2. The method according to claim 1, further comprising positioning said ring between a first pair of arcuate projections positioned on opposite sides of said first segment.

3. The method according to claim 1, further comprising engaging said second segment with said ring between a second pair of arcuate projections on opposite sides of said second segment.

4. The method according to claim 1, further comprising measuring said distance at said ends of said segments.

5. The method according to claim 1, further comprising adjustably tightening said connection members so as to deform said ring.

6. The method according to claim 1, further comprising maintaining said segments in said spaced apart relation during shipping and through handling of said coupling during insertion of said pipe elements into said central space.

7. A method of preparing a factory assembled coupling for receiving pipe elements to be joined end to end, said coupling comprising a plurality of segments, each said segment having first and second ends oppositely disposed and a respective connection member positioned at each said end, said method comprising:

attaching said plurality of segments to one another end to end such that said segments surround and define a central space for receiving said pipe elements, a respective channel being positioned within each said segment, said channels facing said central space;

positioning a flexible, resilient ring within said channel in each said segment, said ring having a ring outer surface engaging said plurality of segments;

adjustably tightening said connection members and thereby drawing each said segment into engagement with said outer surface of said ring and thereby supporting said segments in spaced apart relation from one another on said ring at a distance at least sufficient to permit insertion of said pipe elements into said central space without disassembling said segments from one another.

8. The method according to claim 7, further comprising positioning said ring between pairs of arcuate projections respectively positioned on opposite sides of each said segment.

9. The method according to claim 7, further comprising measuring said distance at said ends of said segments.

10. The method according to claim 7, further comprising adjustably tightening said connection members so as to deform said ring.

11. The method according to claim 7, further comprising maintaining said segments in said spaced apart relation during shipping and through handling of said coupling during insertion of said pipe elements into said central space.

12. A method of preparing a factory assembled coupling for receiving at least one pipe element, said coupling comprising first and second segments, each having first and second ends oppositely disposed and a respective connection member positioned at each said end, said method comprising:

positioning a flexible, resilient ring within a first channel in said first segment, said ring having a ring outer surface engaging said first segment;

engaging a second channel in said second segment with said ring outer surface so as to align each said connection member on said first segment with a respective one of said connection members on said second segment;

attaching said first end of said first segment to said first end of said second segment, and attaching said second end of said first segment to said second end of said second segment such that said segments surround said ring and define a central space for receiving said at least one pipe element;

adjustably tightening said connection members and thereby drawing each said segment into engagement with said outer surface of said ring and thereby supporting said first and second segments in spaced apart relation from one another on said ring at a distance at least sufficient to permit insertion of said at least one pipe element into said central space without disassembling said segments from one another.

13. The method according to claim 12, further comprising adjustably tightening said connection members so as to deform said ring.

14. The method according to claim 12, further comprising maintaining said segments in said spaced apart relation during shipping and through handling of said coupling during insertion of said at least one pipe element into said central space.

* * * * *